(12) United States Patent
Li et al.

(10) Patent No.: US 7,772,164 B2
(45) Date of Patent: Aug. 10, 2010

(54) MULTICOMPONENT VISCOELASTIC SURFACTANT FLUID AND METHOD OF USING AS A FRACTURING FLUID

(75) Inventors: Fang Li, Pleasanton, CA (US); Manilal Dahanayake, Princeton Junction, NJ (US); Allwyn Colaco, South River, NJ (US)

(73) Assignee: Rhodia, Inc., Cranbury, NJ (US)

( * ) Notice: Subject to any disclaimer, the term of this patent is extended or adjusted under 35 U.S.C. 154(b) by 481 days.

(21) Appl. No.: 11/704,429

(22) Filed: Feb. 9, 2007

(65) Prior Publication Data

US 2007/0238624 A1 Oct. 11, 2007

Related U.S. Application Data

(63) Continuation-in-part of application No. 11/141,853, filed on Jun. 1, 2005, now abandoned.

(60) Provisional application No. 60/576,124, filed on Jun. 2, 2004.

(51) Int. Cl.
*C09K 8/62* (2006.01)
*C09K 8/64* (2006.01)
*C09K 8/584* (2006.01)

(52) U.S. Cl. .............. 507/239; 507/240; 507/242; 507/246; 507/256; 507/259

(58) Field of Classification Search ............. 507/239, 507/240, 242, 246, 256, 259
See application file for complete search history.

(56) References Cited

U.S. PATENT DOCUMENTS

| RE28,945 E | 8/1976 | Miscovich et al. |
|---|---|---|
| 4,122,043 A | 10/1978 | Kersnar |
| 4,375,421 A | 3/1983 | Rubin et al. |
| 4,615,825 A | 10/1986 | Teot et al. |
| 4,735,731 A | 4/1988 | Rose et al. |
| 4,806,256 A | 2/1989 | Rose et al. |
| 5,055,219 A | 10/1991 | Smith |
| 5,076,359 A | 12/1991 | Veh |
| 5,202,112 A | 4/1993 | Prencipe et al. |
| 5,258,137 A | 11/1993 | Bonekamp et al. |
| 5,439,317 A | 8/1995 | Bishop et al. |
| 5,470,383 A | 11/1995 | Schermann et al. |
| 5,536,437 A | 7/1996 | Motyka |
| 5,551,516 A | 9/1996 | Norman et al. |
| 5,556,628 A | 9/1996 | Derian et al. |
| 5,575,921 A | 11/1996 | Askin et al. |
| 5,591,377 A | 1/1997 | Nickel et al. |
| 5,607,678 A | 3/1997 | Moore et al. |
| 5,624,891 A | 4/1997 | Smialowicz et al. |
| 5,639,722 A | 6/1997 | Kong et al. |
| 5,728,665 A | 3/1998 | Choy et al. |
| 6,258,859 B1 | 7/2001 | Dahanayake et al. |
| 6,482,866 B1 | 11/2002 | Dahanayake et al. |
| 6,569,829 B1 | 5/2003 | Yamawaki et al. |
| 6,831,108 B2 | 12/2004 | Dahanayake et al. |
| 2002/0023752 A1 | 2/2002 | Qu et al. |
| 2003/0019627 A1 | 1/2003 | Qu et al. |
| 2005/0155762 A1* | 7/2005 | Chen et al. ........... 166/281 |
| 2006/0019836 A1 | 1/2006 | Li et al. |
| 2006/0105919 A1 | 5/2006 | Colaco et al. |

FOREIGN PATENT DOCUMENTS

| CA | I 298697 | 4/1992 |
|---|---|---|
| EP | 0 681 831 A1 | 11/1995 |
| WO | WO98/56497 | 12/1998 |
| WO | WO02/064945 | 8/2002 |
| WO | WO02/064946 | 8/2002 |
| WO | WO2004/007904 | 1/2004 |
| WO | WO2005/118743 | 12/2005 |

OTHER PUBLICATIONS

S. Gravsholt. Journal of Coll, and Interface Sci., 57 (3), 575 (1976).

Hoffman, et al., "The Rheological Bema Viour of Different Viscoelastic Surfactant Solutions," Tenside Surf. Det., 31, pp. 389-400, 1994.

"Rheological Measurements," Encyclopedia of Chemical Technology, vol. 21, pp. 347-372 (John Wiley Sons, Inc., N.Y., N.Y., 1997, 4TH Ed.).

"Oil-Field Applications," Encyclopedia of Polymer Science and Engineering, vol. 10, pp. 328-366 (John Wiley Sons, Inc., N.Y., N.Y., 1987).

H. Hoffman, et al., "Flow Birefringence and Rheological Measurements on Viscoelastic Detergent Solutions," Lehrstuhl Fur Physikalisohe Chemie Der Universitat Bayreuth Universilatsstrape 30, D-8580 Bayreuth, B.R.D., pp. 237-260, 1985.

(Continued)

*Primary Examiner*—Timothy J. Kugel
(74) *Attorney, Agent, or Firm*—Ohlandt, Greeley, Ruggiero & Perle, LLP

(57) ABSTRACT

There is a viscoelastic fluid. The fluid has one or more cationic surfactants selected from the group consisting of certain quaternary salts, certain amines, and combinations thereof; one or more anionic polymers/anionic surfactants; one or more of certain zwitterionic/amphoteric surfactants; and water. There is also a method of fracturing a subterranean formation. The viscoelastic fluid is pumped through a wellbore and into a subterranean formation at a pressure sufficient to fracture the formation. There is also a method for gravel packing a subterranean formation.

23 Claims, 2 Drawing Sheets

OTHER PUBLICATIONS

Saul, D. et al., Phase Structure and Rheological Properties of a Mixed Zwitterionic/Anionic Surfactant System, Unilever Research Port Sunlight Ladoratory, Port Sunlight, Wirral, Cheshire L62 4XN, Jul. 5, 1973, pp. 163-170.

International Search Report for the corresponding International Patent Application No. PCT/US08/01723 dated Jul. 25, 2008.
Supplementary European Search Report for the corresponding European Patent Application No. EP05804876.0-1218 dated Jul. 30, 2009.

* cited by examiner

MULTICOMPONENT VISCOELASTIC SURFACTANT FLUID AND METHOD OF USING AS A FRACTURING FLUID

CROSS-REFERENCE TO RELATED APPLICATIONS

The present application is a continuation-in-part application of U.S. Ser. No. 11/141,853, filed Jun. 1, 2005, now abandoned, which claims priority based on U.S. Provisional Application 60/576,124, filed Jun. 2, 2004, now expired.

BACKGROUND OF THE INVENTION

1. Field of the Invention

The present invention relates to a viscoelastic fluid. The present invention further relates to a method of fracturing a subterranean formation with a viscoelastic fluid.

2. Description of the Related Art

Viscoelastic surfactant (VES) fluids have continued to grow in use in oilfield applications because of their advantages over conventional polymer systems. Such advantages include higher permeability in the oil bearing zone, lower formation or subterranean damage, higher viscosifier recovery after fracturing, elimination of need for enzymes or oxidizers to break down viscosity, and easier hydration and faster build-up to optimum viscosity.

Growth in the use of VES fluids has been inhibited by the high cost of surfactants required to formulate such fluids. Another problem with use of VES fluids is their low tolerance of organic/inorganic salts and clay stabilizers, such as potassium chloride and tetramethyl ammonium chloride (TMAC), in subterranean formations. Another problem with use of VES fluids is the high temperatures encountered in deep well oilfield applications, i.e. up to 250° C. High temperatures can break down the viscosity of VES fluids and render them ineffective in fracturing operations when viscoelastic surfactants are present at low concentrations or require use of high viscoelastic surfactant concentrations to avoid such viscosity breakdown. Use of viscoelastic surfactants at low concentrations also can result in unacceptably long shear recovery time after high shear operation.

In the prior art, attempts have been made to remedy breakdown in viscosity performance by adding polymers and/or cosurfactants, such as low molecular weight anionic polymers. However, shear recovery can be unacceptably long and/or organic/inorganic salt tolerance may be inadequate.

Accordingly, it would be desirable to have a VES fluid that could be formulated on a cost-effective basis, i.e., with relatively low levels of viscoelastic surfactant. It would further be desirable to have a VES fluid that exhibits high tolerance with respect to organic/inorganic salts and clay stabilizers. It would still further be desirable to have a VES fluid with relatively low levels of viscoelastic surfactant that maintains a high level of viscosity performance at high temperatures and shear recovery comparable to fluids with a relatively high concentration of viscoelastic surfactants.

SUMMARY OF THE INVENTION

It is an object of the present invention to have a viscoelastic fluid.

It is another object of the present invention to have a viscoelastic fluid useful in oilfield applications.

It is still another object of the present invention to have a viscoelastic surfactant fluid that can be formulated with a relatively low level of surfactant for cost-effective performance.

It is a further object of the present invention to have a viscoelastic fluid with high tolerance to organic/inorganic salts, such as KCl and TMAC and Ca++ and Mg++ ions.

It is yet a further object of the present invention to have a viscoelastic fluid that maintains a high level of viscosity performance at high temperatures.

It is a further objective of the present invention to have a viscoelastic surfactant fluid that exhibits good shear recovery after high shear operation.

According to this and other objects and advantages of the present invention, there is provided a viscoelastic fluid. The fluid has one or more selected cationic surfactants, one or more selected anionic polymers and/or anionic surfactants, one or more selected zwitterionic and/or amphoteric surfactants, and water.

The cationic surfactant is selected from i) certain quaternary salts and ii) certain amines, iii) certain amine oxides, iv) and combinations thereof.

The quaternary salts have the structural formula:

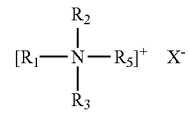

wherein $R_1$ is a hydrophobic moiety of alkyl, alkylarylalkyl, alkoxyalkyl, alkylaminoalkyl or alkylamidoalkyl, and wherein $R_1$ has from about 12 to about 25 carbon atoms and may be branched or straight-chained and saturated or unsaturated.

$R_2$, $R_3$, and $R_5$ are, independently, an aliphatic moiety having from 1 to about 30 atoms or an aromatic moiety having from 7 to about 15 atoms. The aliphatic moiety can be branched or straight-chained and saturated or unsaturated.

X is suitable counter-anion, such as Cl⁻, Br⁻, and $CH_3CH_3SO_4^-$.

The amines have the following structural formula:

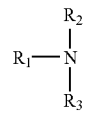

wherein $R_1$, $R_2$ and $R_3$ are as defined above.

The amine oxides have the following structural formula:

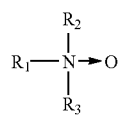

wherein $R_1$, $R_2$ and $R_3$ are as defined above.

The anionic polymer has about 8 to about 100 monomeric units and at least one negatively charged moiety. Sulfonated polymers are preferred. Anionic surfactants will have alkyl chains of about 6 to about 18 carbon atoms with at least one negatively charged moiety.

The zwitterionic surfactant has the following structural formula:

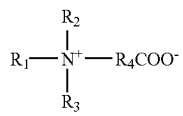

wherein $R_1$, $R_2$, and $R_3$ are as described above. $R_4$ is a hydrocarbyl radical with a chain length of 1 to 4 carbon atoms.

The amphoteric surfactant has the following structural formula:

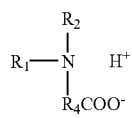

wherein $R_1$, $R_2$, and $R_4$ are as described above.

Further according to the present invention, there is provided a method of fracturing a subterranean formation, comprising the step of pumping the viscoelastic fluid through a wellbore and into a subterranean formation at a pressure sufficient to fracture the formation.

Still further according to the present invention, there is provided a method of gravel packing a subterranean formation, comprising the step of pumping the viscoelastic fluid and gravel into a wellbore.

DETAILED DESCRIPTION OF THE INVENTION

Figure 1:
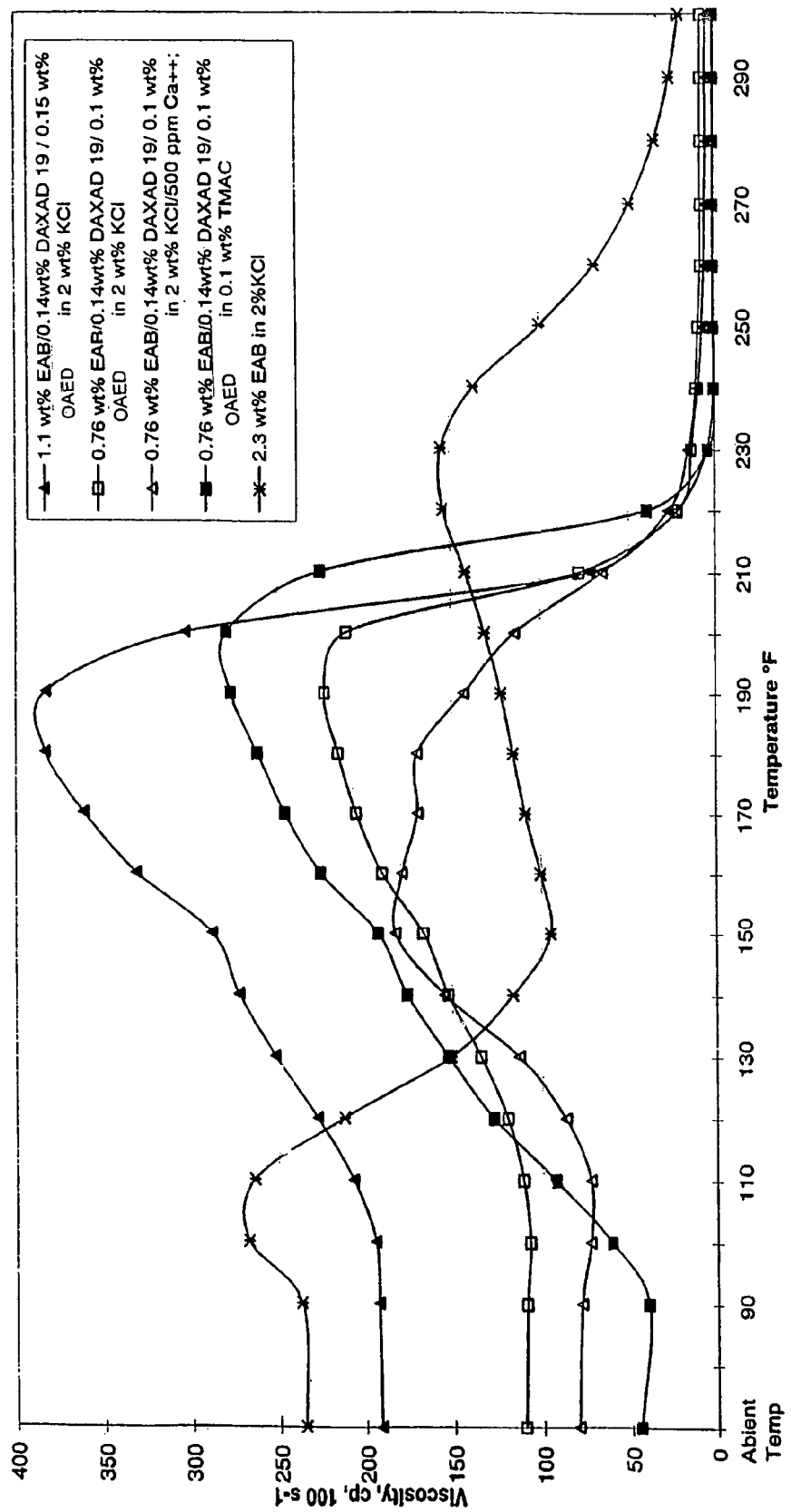
FIG. 1 is a plot diagram of the viscosity profile as a function of temperature for fluids of the present invention versus a comparison fluid.

The property of viscoelasticity in general is well known, and reference is made to S. Gravsholt, Journal of Coll. And Interface Sci., 57(3), 575 (1976); Hoffmann et al., "Influence of Ionic Surfactants on the Viscoelastic Properties of Zwitterionic Surfactant Solutions", Langmuir, 8, 2140-2146 (1992); and Hoffmann et al., "The Rheological Behaviour of Different Viscoelastic Surfactant Solutions," Tenside Surf. Det., 31, 389-400, 1994. Several test methods have been specified in these references to determine whether a liquid possesses viscoelastic properties. One test that has been found useful in determining the viscoelasticity of an aqueous solution is swirling the solution and visually observing whether the bubbles created by the swirling recoil after the swirling is stopped. Any recoil of the bubbles indicates viscoelasticity. Another useful test is to measure the storage modulus (G') and the loss modulus (G") at a given temperature. If G'>G" is at some point or over some range of points below about 10 rad/sec, typically between about 0.001 to about 10 rad/sec, more typically between about 0.1 and about 10 rad/sec, at a given temperature and if G'>$10^{-2}$ Pascals, preferably $10^{-1}$ Pascals, the fluid is typically considered viscoelastic at that temperature. Rheological measurements, such as G' and G", are discussed more fully in "Rheological Measurements", Encyclopedia of Chemical Technology, vol. 21, pp. 347-372, (John Wiley & Sons, Inc., N.Y., N.Y., 1997, 4th ed.).

Viscoelasticity is caused by a different type of micelle formation than the usual spherical micelles formed by most surfactants. Viscoelastic surfactant fluids form worm-like, rod-like or cylindrical micelles in solution. The formation of long, cylindrical micelles creates useful rheological properties. The viscoelastic surfactant solution exhibits shear thinning behavior, and remains stable despite repeated high shear applications.

The viscoelastic surfactants useful in the fluids of the present invention are selected zwitterionic surfactants and/or amphoteric surfactants and cationic surfactants. A zwitterionic surfactant has a permanently positively charged moiety in the molecule regardless of pH and a negatively charged moiety at alkaline pH. A cationic surfactant has a positively charged moiety regardless of pH. An amphoteric surfactant has both a positively charged moiety and a negatively charged moiety over a certain pH range (e.g., typically slightly acidic), only a negatively charged moiety over a certain pH range (e.g., typically slightly alkaline) and only a positively charged moiety at a different pH range (e.g., typically moderately acidic).

The selected viscoelastic surfactants and polymers to form a viscoelastic fluid that exhibits enhanced performance compared to conventional viscoelastic fluids. The viscoelastic fluid of the present invention can exhibit high viscosity levels at high temperatures and low viscoelastic surfactant levels and high tolerance for with respect to $Ca^{++}$ ions and clay stabilizers compared to conventional viscoelastic fluids. The viscoelastic fluid of the present invention exhibits enhanced performance compared to viscoelastic fluids having only the combination of the selected zwitterionic/amphoteric surfactants and cationic surfactants the combination of the zwitterionic/amphoteric surfactants and the selected anionic polymer/anionic surfactant, or the combination of the selected cationic surfactants and the selected anionic polymer/anionic surfactant.

The cationic surfactant is selected from i) certain quaternary salts and ii) certain amines, iii) amine oxide, iv) and combinations thereof.

The quaternary salts have the structural formula:

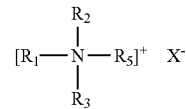

wherein $R_1$ is a hydrophobic moiety of alkyl, alkylarylalkyl, alkoxyalkyl, alkylaminoalkyl or alkylamidoalkyl. $R_1$ has from about 18 to about 30 carbon atoms and may be branched or straight-chained and saturated or unsaturated. Representative long chain alkyl groups include octadecentyl (oleyl), octadecyl (stearyl), docosenoic (erucyl) and the derivatives of tallow, coco, soya and rapeseed oils. The preferred alkyl and alkenyl groups are alkyl and alkenyl groups having from about 18 to about 22 carbon atoms.

$R_2$, $R_3$, and $R_5$ are, independently, an aliphatic group having from 1 to about 30 carbon atoms or an aromatic group having from 7 to about 15 carbon atoms. The aliphatic group preferably has from 1 to about 20 carbon atoms, more preferably from 1 to about 10 carbon atoms, and most preferably from 1 to about 6 carbon atoms. Representative aliphatic groups include alkyl, alkenyl, hydroxyalkyl, carboxyalkyl, and hydroxyalkyl-polyoxyalkylene. The aliphatic group can be branched or straight-chained and saturated or unsaturated. Preferred alkyl chains are methyl and ethyl. Preferred hydroxyalkyls are hydroxyethyl and hydroxypropyl. Preferred carboxyalkyls are acetate and propionate. Preferred hydroxyalkyl-polyoxyalkylenes are hydroxyethyl-polyoxyethylene and hydroxypropyl-polyoxypropylene. Examples of aromatic moieties include cyclic groups, aryl groups, and alkylaryl groups. A preferred alkylaryl is benzyl.

X is suitable anion, such as $Cl^-$, $Br^-$, and $(CH_3)_2SO4^-$.

Representative quaternary salts of the above structure include methylpolyoxyethylene(12-18)octadecanammonium chloride, methylpolyoxyethylene(2-12)cocoalkylammonium chloride, and isotridecyloxypropyl polyoxyethylene (2-12) methyl ammonium chloride.

The amines have the following structural formula:

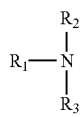

wherein $R_1$, $R_2$, and $R_3$ are as defined above.

Representative amines of the above structure include polyoxyethylene(2-15)cocoalkylamines, polyoxyethylene(12-18) tallowalkylamines, and polyoxyethylene(2-15)oleylamines.

The fluid also has an anionic polymer. The polymer has about 8 to about 100 monomeric units and at least one negatively charged moiety. Sulfonated polymers are preferred. Representative anionic polymers include, but are not limited to, polynapthalene sulfonate, sulfonated polystyrenes, and sulfonated styrene/maleic anhydride copolymers. A most preferred anionic polymer is polynapthalene sulfonate and has the following structural formula:

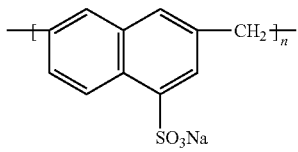

wherein n is an integer from about 8 to about 100. Preferred polynapthalene sulfonates have a weight average molecular weight of from about 2,000 to about 20,000.

Another preferred anionic polymer are polyalkylene sulfonates having the following structural formula:

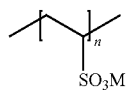

wherein n is an integer from about 8 to about 100. M is an inorganic or organic cation, such as alkaline metal or ammonium ions, e.g. $K^+$, $Na^+$, and $NH_4^+$.

Selected anionic surfactants useful in the viscoelastic surfactant fluid of the present invention include those having alkyl chains of about 6 to about 18 carbon atoms with at least one negatively charged moiety.

Representative anionic surfactants include those of the following structural formulas:

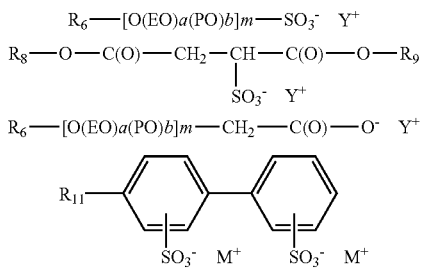

and combinations thereof.

$R_6$ is selected from a group consisting of alkyl, aryl, alkaryl, alkylarylalkyl, arylalkyl, alkylamidoalkyl, alkylaminoalkyl; wherein the alkyl group has from about 6 to about 18 carbon atoms; wherein the aryl group represents a phenyl, diphenyl, diphenylether, or naphthalene moiety; and wherein the total carbon atom content of $R_6$ is no more than about 18 carbon atoms. $R_6$ is preferably $C_{10}$ to $C_{18}$ alkyl or alkylamidoalkyl. $R_6$ can be represented by octyl, nonyl, decyl, dodecyl and the like. Substitutes from natural sources having mixed carbon chain lengths can be used or purified to reduce the number of carbon chain lengths in the alkyl groups. Preferred alkylamidoalkyls are coco/lauryl amidopropyl, oleyl/stearyl amidopropyl, octylamidopropyl, and decylamidopropyl.

M represents hydrogen, an alkali metal such as sodium or potassium, or $—[R_7-(EO)_a(PO)_b(BO)_c]_m—O—]_q—P(O)(OM)_2$.

Y represents a counter-ion, which is preferably an alkali metal such as sodium or potassium, more preferably sodium; EO represents ethyleneoxy radicals, PO represents propyleneoxy radicals. BO represents butoxy radicals. The letters a, b, and c are, independently, integers from 0 to 50, wherein "a" is preferably an integer from 0 to 15 and "b" is preferably an integer from 0 to 10, and "c" is preferably an integer from 0 to 10, wherein EO, PO and BO, radicals can be randomly mixed or in the discrete blocks. "m" is 0 or 1. "$R_7$" is $C_8$ to $C_{18}$ alkylene. $R_8$ is $C_8$-$C_{18}$ alkyl or $C_8$-$C_{18}$ alkylamido. "$R_9$" is $C_1$-$C_4$ alkyl or Y (counter-ion). $R_{10}$ is $C_{10}$-$C_{14}$ alkyl. "q" is an integer from 1 to about 10.

Selected zwitterionic surfactants useful in the viscoelastic surfactant fluid of the present invention are represented by the following structural formula:

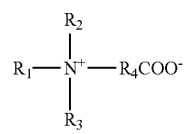

wherein $R_1$ is as described above. $R_2$ and $R_3$ are, independently, an aliphatic moiety having from 1 to about 30 carbon atoms or an aromatic moiety having from 7 to about 15 carbon atoms. The aliphatic moiety preferably has from 1 to about 20 carbon atoms, more preferably from 1 to about 10 carbon atoms, and most preferably from 1 to about 6 carbon atoms. The aliphatic group can be branched or straight chained and saturated or unsaturated. Representative aliphatic groups include alkyl, alkenyl, hydroxyalkyl, carboxyalkyl, and hydroxyalkyl-polyoxyalkylene. Preferred alkyl chains are methyl and ethyl. Preferred hydroxyalkyls are hydroxyethyl and hydroxypropyl. Preferred carboxyalkyls are acetate and propionate. Preferred hydroxyalkyl-polyoxyalkylenes are hydroxyethyl-polyoxyethylene or hydroxypropyl-polyoxypropylene). $R_4$ is a hydrocarbyl radical (e.g. alkylene) with chain length 1 to 4 carbon atoms. Preferred are methylene or ethylene groups. Examples of aromatic moieties include cyclic groups, aryl groups, and alkylaryl groups. A preferred arylalkyl is benzyl.

Specific examples of selected zwitterionic surfactants include the following structures:

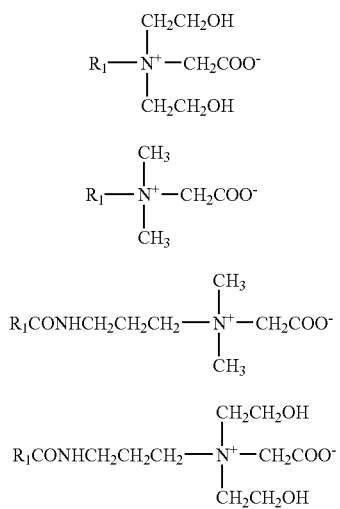

wherein $R_1$ is as described above.

Other representative zwitterionic surfactants include dihydroxyethyl tallow glycinate, oleamidopropyl betaine, and erucyl amidopropyl betaine.

Selected amphoteric surfactants useful in the viscoelastic surfactant fluid of the present invention are represented by the following structural formula:

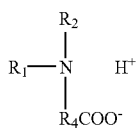

wherein $R_1$, $R_2$, and $R_4$ are as described above.

Specific examples of amphoteric surfactants include those of the following structural formulas:

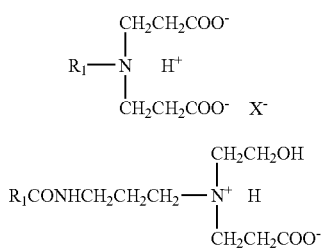

wherein $R_1$ is as described above. $X^+$ is an inorganic cation such as $Na^+$, $K^+$, $NH_4^+$ associated with a carboxylate group or hydrogen atom in an acidic medium.

The selected zwitterionic and amphoteric surfactants are functionally interchangeable and may be used separately or alone (alternatively) or in combination with each other. Additional teachings to the selected zwitterionic and amphoteric surfactants are disclosed in U.S. Pat. No. 6,258,859 B1, which is incorporated herein in its entirety.

The surfactants are used in an amount, which, in combination with the other ingredients, such as the anionic polymer, is sufficient to form a viscoelastic fluid, which amount will typically be a minor amount by weight of the fluid (e.g., less than about 50% by weight). The total concentration of the selected zwitterionic/amphoteric and cationic surfactants typically ranges from about 0.1 to about 10 wt %, more typically from about 0.1 to about 5 wt %, and even more typically from about 0.25 to about 2 wt % based on the weight of the fluid. The weight percentage of the cationic surfactant in the total active surfactant (exclusive of solvents) typically ranges from about 1 to about 40 wt %, more typically from about 3 to about 20 wt %, and even more typically from about 5 to about 20 wt % (based on total required cationic surfactant and zwitterionic/amphoteric surfactant of the present invention). Because of the cost of the surfactants, it is desirable, if possible, to minimize surfactant concentration. Most preferably, the concentration of the selected zwitterionic/amphoteric and cationic surfactants will be less than 3 wt % based on fluid weight. The selected anionic polymer is typically used at about 0.01 to about 5 wt %, more typically about 0.05 to about 3 wt %, and most typically 0.1 to 0.5 wt % based on weight of the fluid. Optimum concentrations for the selected surfactants and anionic polymers can be determined experimentally for a particular fluid system.

The viscoelastic fluid is aqueous. Water is preferably present in an amount by weight about 50 percent or more by weight of the fluid. Most preferred fluids have about 70 weight percent or more of water by weight of the fluid. The water can be from any source so long as the source has no contaminants incompatible with the other components of the viscoelastic fluid (e.g., such as to cause undesirable precipitation). Thus, the water need not be potable and may be brackish or contain other materials typical of sources of water found in or near oil fields.

The fluid optionally has one or more members from the following group: organic acids, organic acid salts, inorganic salts, and combinations thereof. This member will typically be present in a minor amount (e.g., about 20 wt % or less by weight of the fluid).

The organic acid is typically a sulfonic acid or a carboxylic acid and the anionic counter-ion of the organic acid salts are typically sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred are salicylate, phthalate, p-toluene sulfonate, sodium xylene sulfonates, hydroxynaphthalene carboxylates, e.g. 5-hydroxy-1-naphthoic acid, 6-hydroxy-1-naphthoic acid, 7-hydroxy-1-naphthoic acid, 1-hydroxy-2-naphthoic acid, preferably 3-hydroxy-2-naphthoic acid, 5-hydroxy-2-naphthoic acid, 7-hydroxy-2-naphthoic acid, and 1,3-dihydroxy-2-naphthoic acid and 3,4-dichlorobenzoate. The organic acid or salt thereof typically aids the development of increased viscosity which is characteristic of preferred fluids. Although no bound by any theory, the association of the organic acid or salt thereof with the micelle might decrease the aggregation curvature of the micelle, and, thus, promote the formation of a worm-like or rod-like micelle. The organic acid or salt thereof will typically be present in the viscoelastic fluid at a weight concentration of from about 0.1 wt % to about 10 wt %, more typically from about 0.1 wt % to about 7 wt %, and even more typically from about 0.1 wt % to about 6 wt % based on fluid weight.

The inorganic salts that are particularly suitable for use in the viscoelastic fluid include water-soluble potassium, sodium, or ammonium salts, such as potassium chloride or ammonium chloride. Potassium chloride is most preferred. Additionally, calcium chloride, calcium bromide and zinc halide salts may also be used. The inorganic salts may aid in the development of increased viscosity, which is characteristic of preferred fluids. Further, the inorganic salt may assist in maintaining the stability of a geologic or subterranean formation to which the fluid is exposed. Formation stability, in particular clay stability (by inhibiting hydration of the clay), can be achieved at a concentration levels of a few percent by weight or less. Thus, density of fluid is usually not significantly altered by the presence of the inorganic salt. If fluid density is an important consideration, heavier inorganic salts may be used. The inorganic salt will typically be present in the viscoelastic fluid at a weight concentration of from about 0.1% to about 30%, more typically from about 0.1% to about 10%, and even more typically from about 0.1% to about 8%. Organic salts, e.g. trimethylammonium hydrochloride and tetramethylammonium chloride, may also be useful in addition to, or as a replacement for, the inorganic salts.

As an alternative to the organic salts and inorganic salts, or as a partial substitute therefor, one can use a medium to long chain alcohol (preferably an alkanol), preferably having five to ten carbon atoms, or an alcohol ethoxylate (preferably an alkanol ethoxylate) preferably of a 12 to 16 carbon alcohol and having 1 to 6, preferably 1-4, oxyethylene units.

The viscoelastic surfactant solution is useful as a fracturing fluid or water-based hydraulic fluid. The viscoelastic fluid used as a fracturing fluid may optionally contain a gas such as air, nitrogen or carbon dioxide to provide an energized fluid or a foam.

When used as a hydraulic fracturing fluid, the viscoelastic fluid may contain other conventional constituents that perform specific desired functions, e.g., corrosion inhibition, fluid-loss prevention and the like. A proppant can be suspended in the fracturing fluid. The pH of the fluid will typically range from strongly acidic (e.g., less than a pH of about 3) to slightly alkaline (e.g., from a pH just greater than 7.0 to about 8.5, more typically to about 8.0) or moderately alkaline (e.g., a pH of about 8.5 to about 9.5).

The viscoelastic fluid may optionally have one or more additional thickeners and fluid-loss control additives known in the industry, such as water-soluble or water-dispersible polymers (guar and guar derivatives, xanthan, polyacrylamide, starch and starch derivatives, cellulosic derivatives, polyacrylates, polyDADMAC [poly(diallyl dimethyl ammonium chloride] and combinations thereof), and clay (Bentonite and attapulgite).

The viscoelastic fluid may optionally have conventional surfactants/cosurfactants other than the viscoelastic surfactants described above. Such surfactants/cosurfactants can include anionic, cationic, nonionic, zwitterionic, and amphoteric species. The fluid may also have any solvent or vehicles known in the art (in addition to water), such as lower monohydric alcohols, polyhydric alcohols, and the like.

The viscoelastic fluid is useful in conventional hydraulic fracturing methods. Useful methods are disclosed in U.S. Pat. No. 5,551,516, which is incorporated by reference. Oil-field applications and methods are also described in "Oil-field Applications", Encyclopedia of Polymer Science and Engineering, vol. 10, pp. 328-366 (John Wiley & Sons, Inc., New York, N.Y., 1987), which is also incorporated herein by reference.

Hydraulic fracturing refers to methods used to stimulate the production of fluids, such as oil and natural gas, from subterranean formations. In hydraulic fracturing, a fracturing fluid is injected through a wellbore and against the face of the formation at a pressure and flow rate at least sufficient to overcome the overburden pressure and to initiate and/or extend a fracture(s) into the formation. The fracturing fluid usually carries a proppant such as 20-40 mesh sand, bauxite, glass beads, and the like, suspended in the fracturing fluid and transported into a fracture. The proppant keeps the formation from closing back down upon itself when pressure is released. The proppant filled fractures provide permeable channels through which the formation fluids can flow to the wellbore and thereafter be withdrawn. Viscoelastic fluids have also been extensively used in gravel pack treatment.

U.S. Ser. No. 11/141,853, filed Jun. 1, 2005 and U.S. Provisional Application 60/576,124, filed Jun. 2, 2004, are hereby incorporated herein in their entirety.

The following are examples of the present invention. They are illustrative of the invention and are not to be construed as limiting. Unless otherwise indicated, all percentages or parts are by weight.

EXAMPLES

Fluids of the present invention were prepared and tested for viscosity performance as a function of temperature. Viscosity performance related to suitability for use in fracturing applications.

The zwitterionic surfactant employed was erucyl amidopropyl betaine (EAB). The anionic polymer employed was polynapthalene sulfonate (DAXAD 19 polymer manufactured by Hampshire Chemical Corp.). The cationic surfactants employed were methylpolyoxyethylene octadecanammonium chloride (OAED) and polyoxyethylene cocoalkylamines (CAEO). All ingredients were formulated by mixing.

Two fluids of the following formulations were tested: 27 wt % EAB/3.8 wt % DAXAD 19/3.9 wt % CAEO (balance is solvents); and 27 wt % EAB/3.8 wt % DAXAD 19/3.9 wt % OAED (balance is solvents).

The fluids showed very good viscosity performance at the 2.1 wt % surfactant use level (0.9 wt % active) up to 215° F. with very good shear recovery (less than 15 seconds). The systems were compatible with 2 wt % KCl (potassium chloride), 2 wt % KCl with 500 ppm $Ca^{++}$, 0.1 wt % TMAC (trimethyl ammonium chloride) and 0.1 wt % TMAC with 300 ppm $Ca^{++}$. The three components were formulated together with IPA and water with very good stability and flowability in the temperature range from 20° F. to 150° F.

Additional fluids were formulated as set forth in FIG. 1. Four fluids of the present invention were formulated as follows: I) 1.1 wt % EAB/0.14 wt % DAXAD 19/0.15 wt % OAED in 2 wt % KCl (balance is solvents); II) 0.76 wt % EAB/0.14 wt % DAXAD 19/0.1 wt % OAED in 2 wt % KCl (rest are solvents); III) 0.76 wt % EAB/0.14 wt % DAXAD 19/0.1 wt % OAED in 2 wt % KCl/500 ppm Ca++ (balance is solvents); and IV) 0.76 wt % EAB/0.14 wt % DAXAD 19/0.1 wt % OAED in 0.1 wt % TMAC (balance is solvents). A comparative fluid was formulated as follows with only 2.3 wt % EAB in 2 wt % KCl(balance is solvents). The viscosity performance versus temperature is set forth in FIG. 1.

Figure 2:
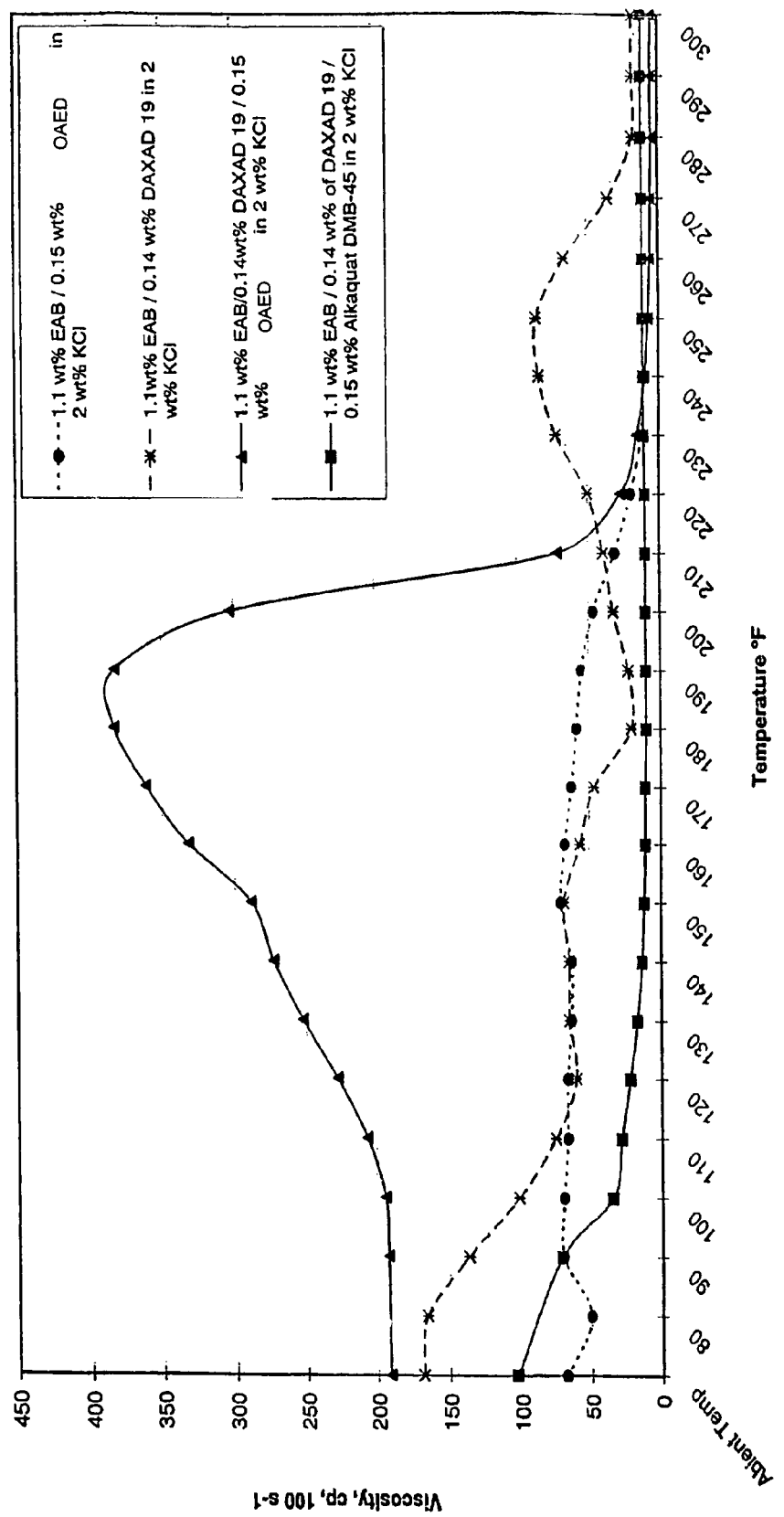
FIG. 2 is a plot diagram of the viscosity profile as a function of temperature for a fluid of the present invention versus comparison fluids.

An additional fluid of the present invention and three comparative fluids were formulated and their viscosity performance versus temperature tested. A fluid of the present invention was formulated as follows: 1.1 wt % EAB/0.14 wt % DAXAD 19/0.15 wt % OAED in 2 wt % KCl (balance is solvents). Three comparative fluids were formulated as follows: I) 1.1 wt % EAB/0.15 wt % OAED in 2 wt % KCl (balance is solvents); II) 1.1 wt % EAB/0.14 wt % DAXAD 19 in 2 wt % KCl (balance is solvents); and III) 1.1 wt % EAB/0.14 wt % of DAXAD 19/0.15 wt % Alkaquat DMB-451 (benzyl triammonium chloride made by Rhodia Inc.) in 2 wt % KCl (balance is solvents). The viscosity performance versus temperature is set forth in FIG. 2.

It should be understood that the foregoing description is only illustrative of the present invention. Various alternatives and modifications can be devised by those skilled in the art without departing from the invention. Accordingly, the present invention is intended to embrace all such alternatives, modifications and variances that fall within the scope of the appended claims.

What is claimed is:

1. A viscoelastic fluid, comprising:
   one or more cationic surfactants;
   one or more anionic polymers;
   one or more zwitterionic and/or amphoteric surfactants; and
   water;
   wherein the one or more cationic surfactants includes methylpolyoxyethylene octadecanammonium chloride
   wherein the zwitterionic surfactant has the following structural formula:

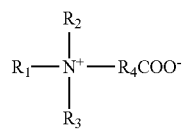

wherein $R_1$, $R_2$, and $R_3$ are as described above; $R_4$ is a hydrocarbyl radical with a chain length 1 to 4; and
   wherein the amphoteric surfactant has the following structural formula:

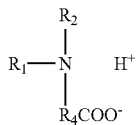

wherein $R_1$, $R_2$, and $R_4$ are as described above.

2. The fluid of claim 1, further comprising a component selected from the group consisting of organic acids, organic acid salts, inorganic salts, and combinations thereof.

3. The fluid of claim 2, wherein the component is selected from the group consisting of potassium chloride and trimethylammonium chloride.

4. The fluid of claim 2, wherein the component is present at about 0.1 wt % to about 10 wt %.

5. The fluid of claim 2, further comprising a proppant.

6. The fluid of claim 1, wherein the one or more anionic polymers has the following structural formula:

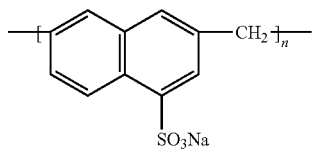

wherein n is an integer from about 8 to about 100.

7. The fluid of claim 6, wherein the one or more anionic polymers is present at from about 0.1 wt % to about 5 wt %.

8. The fluid of claim 1, wherein the one or more anionic polymers has the following structural formula:

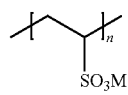

wherein n is an integer from about 8 to about 100.

9. The fluid of claim 8, wherein the one or more anionic polymers is present at from about 0.1 wt % to about 5 wt %.

10. The fluid of claim 1, wherein the one or more anionic polymers is present at from about 0.1 wt % to about 5 wt %.

11. The fluid of claim 10, wherein $R_1$ is an alkyl or alkenyl group having about 18 to about 22 carbon atoms, and wherein $R_2$, $R_3$ and $R_5$, independently, each have about 1 to about 6 carbon atoms.

12. The fluid of claim 1, wherein the one or more cationic surfactants is present at from about 1 to about 40 wt % based on weight of active surfactant.

13. The fluid of claim 1, wherein the one or more cationic surfactants is present at from about 5 to about 20 wt % based on weight of active surfactant.

14. The fluid of claim 1, wherein the one or more zwitterionic surfactants is selected from the group consisting of the following structural formulas:

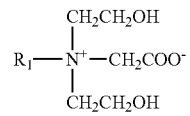

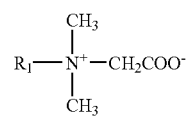

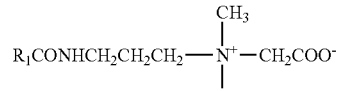

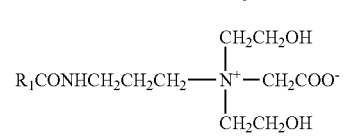

and combinations thereof.

15. The fluid of claim 1, wherein the one or more zwitterionic surfactants is erucyl amidopropyl betaine.

16. The fluid of claim 1, wherein the water is present at about 50 wt % or more based on fluid weight.

17. The fluid of claim 1, wherein the water is present at about 70 wt % or more based on fluid weight.

18. The fluid of claim 1, wherein the one or more cationic surfactants and the one or more zwitterionic and/or amphoteric surfactants are present at about 0.1 to about 10 wt % based on fluid weight.

19. The fluid of claim 1, wherein the one or more cationic surfactants and the one or more zwitterionic and or amphoteric surfactants are present at about 0.25 to about 2 wt % based on fluid weight.

20. The fluid of claim 1, wherein the one or more cationic surfactants and the one or more zwitterionic and/or amphoteric surfactants are present at less than 2 wt % based on fluid weight.

21. The fluid of claim 1, further comprising a proppant.

22. The fluid of claim 1, wherein the one or more cationic surfactants is present at from about 1 to about 40 wt % based on weight of active surfactant, wherein the anionic polymer is present at from about 0.1 wt % to about 5 wt % based on fluid weight, wherein the water is present at about 50 wt % or more based on fluid weight, wherein the one or more cationic surfactants and the one or more zwitterionic and/or amphoteric surfactants are present at about 0.1 to about 10 wt % based on fluid weight, the fluid further comprising a component selected from the group consisting of organic acids, organic acid salts, inorganic salts, and combinations thereof, wherein the component is present at about 0.1 wt % to about 10 wt % based on fluid weight.

23. The fluid of claim 1, wherein $R_1$ is an alkyl or alkenyl group having about 18 to about 22 carbon atoms, and wherein $R_2$, $R_3$ and $R_5$, independently, each have about 1 to about 6 carbon atoms.

* * * * *